Jan. 10, 1956  R. T. ELSEN  2,729,979

FRICTION WHEEL SPINDLE PRESSES

Filed Sept. 9, 1954

Inventor:
Richard Theodor Elsen
By
Walter Becker
Patent Agent

United States Patent Office 2,729,979
Patented Jan. 10, 1956

2,729,979

FRICTION WHEEL SPINDLE PRESSES

Richard Theodor Elsen, Essen, Germany

Application September 9, 1954, Serial No. 455,037

Claims priority, application Germany October 13, 1953

3 Claims. (Cl. 74—213)

The present invention relates to friction wheel spindle presses. Friction wheel spindle presses are known which are provided with a flywheel disc arranged axially with regard to the spindle, while the flywheel disc is designed as a cup wheel and is driven by means of friction wheels engaging each other.

The heretofore known presses of this type have the drawback that the quickly wearing lining of the friction driving wheels cannot be exchanged without dismantling parts of the driving mechanism.

A further drawback of the said known presses consists in that due to the wear of the friction lining, the control stroke of the hand lever varies continuously, and the readjustment of the control elements must be carried out while the machine is at a standstill.

It is, therefore, an object of the present invention to provide an arrangement which will overcome the above-mentioned drawbacks.

It is another object of this invention to provide a friction wheel spindle press in which the change in the control stroke of the hand lever brought about by the wear of the friction lining can be readjusted during the operation of the press.

It is still another object to provide a friction wheel spindle press of the above-mentioned type which will make it possible during the operation of the press easily to compensate for any even very small play between the driving wheels and the cup wheel.

These and other objects and advantages of this invention will appear more clearly from the following specification in connection with the accompanying drawing, in which.

General arrangement

Figure 1:
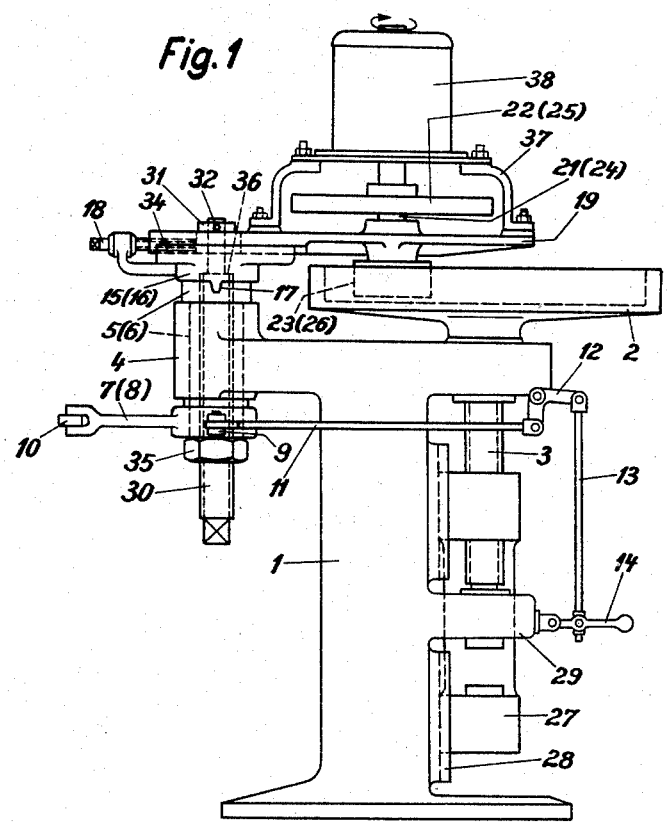
Fig. 1 is a side view of the friction wheel spindle press according to the invention.
Figure 2:
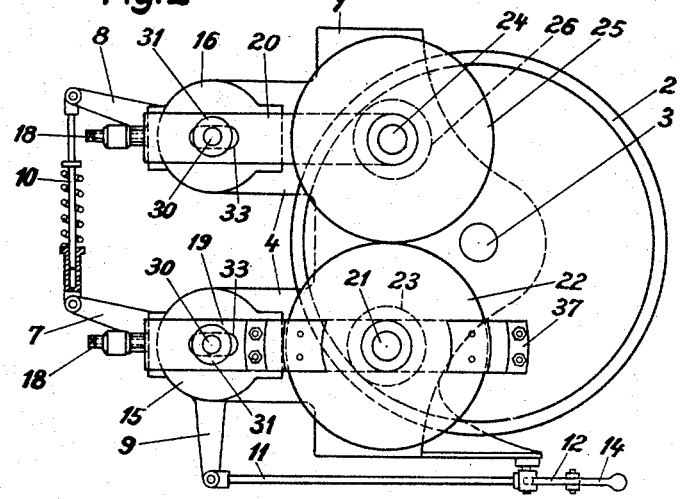
Fig. 2 is a top view of the friction wheel spindle press of Fig. 1 after the driving motor has been removed.

The primary feature according to the present invention consists in that a releasable coupling between the rocker arms and the changeover lever mechanism is provided, while the rocker arms are displaceable in the direction of their tilting axis to such an extent that they can be moved out of range of the cup wheel, whereby the coupling between the rocker arms and the changeover lever mechanism is released so that the rocker arms can be tilted beyond the periphery of the cup wheel.

According to a further development of the invention, the rocker arms consist of two parts displaceable relative to each other and perpendicular to the tilting axis.

Structural arrangement

Rotatably journaled in a machine frame 1 is a flywheel disc 2, which is designed in the manner of a cup wheel. Connected to the flywheel disc 2 and extending in an axial direction thereof is a threaded spindle 3. The machine frame 1 is provided with two bearing brackets 4. Each of said bearing brackets has rotatably journaled therein bushings 5 and 6, respectively, the lower ends of which have pivotally connected thereto a control lever 7 and 8, respectively. The control levers 7 and 8 are interconnected by means of an elastic operating intermediate member 10. The control lever 7 comprises a lever arm 9 which is operable by a hand lever 14 through the intervention of a push rod 11, a bell crank lever 12 and a pull rod 13.

The upper ends of the bushings 5 and 6, respectively, support a lower rocker arm section 15 and 16, respectively, which, by means of a coupling nose 17, respectively, engage a corresponding coupling recess in the bushing 5 and 6 so that said lower rocker arm sections are coupled to the bushings to rotate in unison therewith. Mounted on the said lower rocker arm sections 15 and 16 are upper rocker arm sections 19 and 20, respectively, which are longitudinally displaceable by means of threaded spindles 18. Journaled in the upper rocker arm section 19 is a driving shaft 21 for a friction wheel 22 and a driving wheel 23. Journaled in the upper rocker arm section 20 is a driving shaft 24 for a friction wheel 25 and a drive wheel 26. A bridge 37, carrying a motor 38, is bolted to the rocker arm 19, while said motor is coupled to the drive shaft 21.

When the hand lever 14 is tilted downwardly, i. e., in a clockwise direction, it will be evident from Fig. 1 that through the intervention of the lever system 13, 12, 11 and the lever arm 9, the bushing 5, and with the latter also, the rocker arm 15, 19 will be turned in such a manner that the driving wheel 23 directly driven by the motor 38 will engage the cup wheel 2 to bring about a pressing stroke. Corresponding to the direction of rotation indicated in Fig. 1 by an arrow, the threaded spindle 3 lifts the movable press jaw 27, which latter slides in a guide 28 on the machine frame 1, and moves the said jaw 27 toward the fixed press jaw 29. It should be noted that when the lever 14 is tilted downwardly for effecting the pressing stroke, the bushing 6 is rotated in the same direction as the bushing 5 by means of the elastic element 10 and the control lever 8 so that the rocker arm 16, 20 is tilted in such a manner that the driving wheel 26 does not engage the cup wheel 2.

However, when tilting the hand lever 14 in a counter-clockwise direction for effecting the opening of the press, the bushing 5 and the rocker arms 15, 19 are rotated in the reverse direction in such a manner that the driving wheel 23 is out of contact with the cup wheel 2, while the rocker arm 16, 20 is tilted in such a manner and to such an extent that the driving wheel 26 rests against the cup wheel 2. The friction wheel 22, which is directly driven by the motor 38, then presses against the friction wheel 25 and through the latter and driving wheel 26 connected to wheel 25 drives the cup wheel 2 in opposite direction. Consequently, the spindle 3 now moves the press jaw 27 away from the fixed jaw 29, thereby opening the press.

The control lever 7, 8, the bushings 5, 6 and the lower rocker arm sections 15, 16 are provided with bores, which, in the bushings 5, 6, have an inner thread, while the upper rocker arm sections 19, 20 are provided with elongated holes 33. Threaded spindles 30 extend through the said bores and elongated holes. The discs 31 are connected to the upper end of the threaded spindles 30 by means of bolts 32. When the upper rocker arm sections 19, 20, which slide in guides 34 on the lower arm sections 15, 16, are displaced, the threaded spindles 30 will slide in the elongated holes 33. In the operating position, the threaded spindles 30 are screwed downwardly to press the rocker arms 15, 19 and 16, 20 against the bushings 5, 6 by means of the discs 31 so that the coupling noses 17 of the lower rocker arm sections 15, 16 firmly engage the corresponding coupling recesses in the bushings 5, 6.

The threaded spindles 30 are then secured in their respective positions by means of nuts 35.

If it is desired to exchange worn friction or driving wheels, the nuts 35 are loosened, and the spindles 30 are screwed upwardly in the bushings 5 and 6, respectively. The upper ends of the spindles 30 are of reduced diameter where they pass through the lower rocker arm sections 15, 16, respectively and form annular shoulder surfaces 36. When the spindles are screwed upwardly, the said shoulders 36 press against corresponding surfaces of reduced bores in the lower rocker arm sections. In this way the rocker arms 15, 19 and 16, 20 are uncoupled and raised so that the wheels 22, 23, 25 and 26 can be tilted out of the range of the cup wheel 2 and can be removed without hindrance.

Wear of the friction linings during the operation of the press, which wear would vary the control stroke of the hand lever 14, can be compensated for during operation by displacing the upper rocker arm sections 19, 20 through the intervention of the threaded spindles 18, after the threaded spindles 30 have been loosened. In this way, the smallest possible play between the driving wheels 23, 26 and the cup wheel 2 can easily be adjusted.

It is, of course, to be understood that the present invention is by no means limited to the particular construction shown in the drawing, but also comprises any modifications within the scope of the appended claims.

What I claim is:

1. In combination in a friction wheel spindle press having a flyweel disc designed as a cup wheel and operatively connected to a movable pressing member, and having driving wheels drivingly connected with each other and adapted drivingly to engage said cup wheel: a pair of shaft means, a pair of supporting arms respectively supporting said driving wheels and being swingable about the axes of said shaft means, a lever system, releasable coupling means arranged for selectively operatively connecting said lever system with said supporting arms for respectively swinging the same about said axes, means respectively associated with said shaft means and movable in axial direction of said shaft means for disengaging the coupling connection between said lever system and the respective supporting arms and lifting the respective driving wheel out of said cup wheel to thereby allow swinging the respective driving wheel beyond the periphery of said cup wheel.

2. A spindle press according to claim 1, in which each of said supporting arms comprises two members adjustable relative to each other in a direction perpendicular to the longitudinal axis of the respective shaft means, and means operable to effect relative movement between said two members.

3. In combination in a friction wheel spindle press having a flywheel disc designed as a cup wheel and operatively connected to a movable pressing member, and having driving wheels drivingly connected with each other and adapted drivingly to engage said cup wheel: a frame, a pair of brackets connected to said frame, each of said brackets being provided with a bore, a pair of bushings respectively rotatably mounted in said bores, each of said bushings having its interior provided with a thread, a pair of threaded spindles passing through and threadedly engaging said bushings, a pair of supporting arms pivotally supported by said spindles, releasable coupling means arranged for respectively rotatably interconnecting said bushings and said supporting arms, said supporting arms respectively supporting said driving wheels, and a lever system operable selectively to turn said bushings about the respective axes thereof, said spindles being movable in axial direction so as to disengage the coupling connection between the respective bushing and the respective supporting arm and to lift the respective driving wheel out of said cup wheel, to thereby allow swinging the respective driving wheel beyond the periphery of said cup wheel.

References Cited in the file of this patent
UNITED STATES PATENTS

| | | |
|---|---|---|
| 827,204 | Bauch | July 31, 1906 |
| 1,660,489 | Hirvonen | Feb. 28, 1928 |
| 2,264,620 | Conrad | Dec. 2, 1941 |